C. E. BROWN.
Attachment for Plows.
No. 219,144. Patented Sept. 2, 1879.
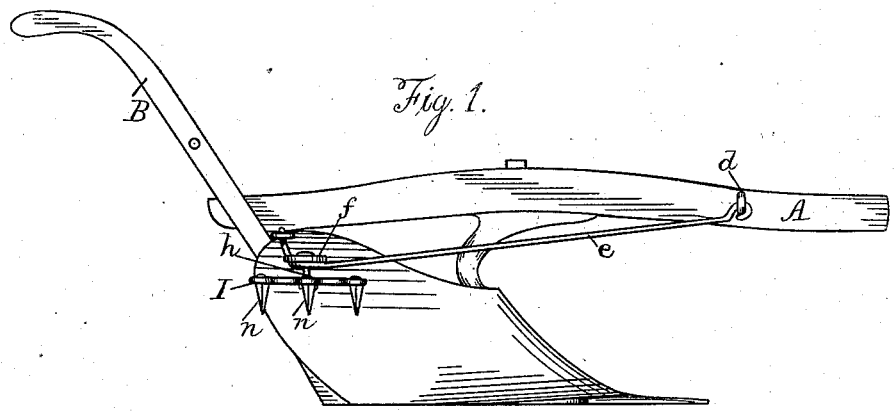
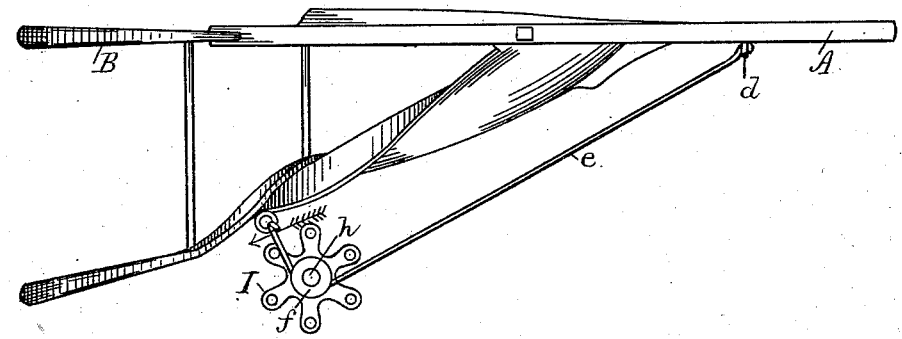
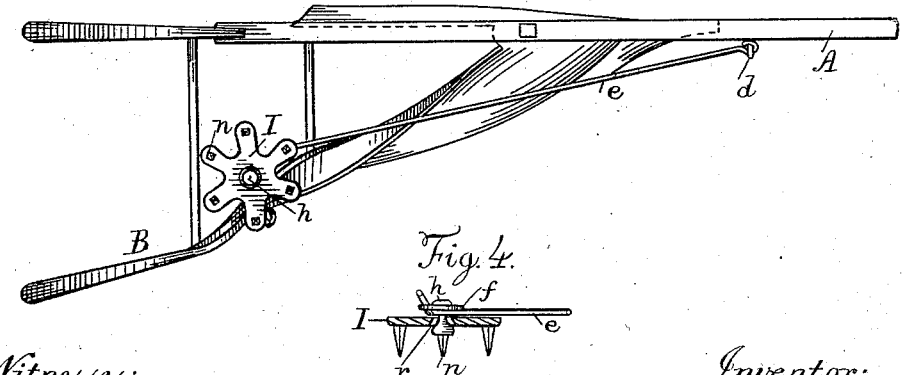
Witnesses:
Chas. E. Lewis.
A. E. Eader
Inventor:
Caleb E. Brown
By his Atty
Chas. B. Mann

UNITED STATES PATENT OFFICE.

CALEB E. BROWN, OF JACKSON, MICHIGAN.

IMPROVEMENT IN ATTACHMENTS FOR PLOWS.

Specification forming part of Letters Patent No. 219,144, dated September 2, 1879; application filed April 30, 1879.

*To all whom it may concern:*

Be it known that I, CALEB E. BROWN, of Jackson, in the county of Jackson and State of Michigan, have invented a new and useful Improvement in Plows, of which the following is a specification.

My invention relates to an improvement in rotary-harrow attachments for plows, the object of the invention being to attach a rotary harrow to a plow so that it shall have position alongside and at the rear extremity of the mold-board, in order that the teeth of the harrow may take effect on the soil as soon as the furrow is turned, this particular location of the harrow relative to the mold-board serving best to secure the rotation of the harrow, and to so connect the harrow thus located with the plow that it may be turned up and entirely over, allowing it to rest on the plow between the handles, where it is completely out of the way, and no obstruction or hinderance in moving the plow about.

Figure 1 is a side view of a plow with my attachment. Fig. 2 is a plan view of same. Fig. 3 is a plan view, showing drag turned over. Fig. 4 shows the drag in section.

The letter A represents the plow-beam; B, the handles; C, the mold-board. At the side of the beam is attached a hook or eye, $d$, by which a rod, $e$, connects, and which extends back to the point where the furrow is turned off from the mold-board, where it is bent, and thence continues toward the plow-handle, to which it is attached in the same manner as it is to the beam—*i. e.*, by means of hook and eye. At that part of the rod where the bend occurs a socket-plate, $f$, is attached, in which is fitted a pin, $h$, having its lower end projecting below, on which the star-shaped drag I is attached and adapted to rotate. This drag is provided with teeth $n$. In the present instance six teeth are used. The size of the drag should be adapted to the measurement of the rod from the bend to mold-board, so that the drag will clear the mold-board as it revolves. The eye $r$ in the center of the drag is tapering, and enough larger than the wrist-pin, on which it turns, to permit it to oscillate or tilt in turning, as occasion may require.

The attachment of the drag to the plow by means of the bent rod and the hook-and-eye connection allows it freedom to rise or fall, and permits it to be turned up and entirely over, so as to rest between the handles, as shown in Fig. 3.

In operation the drag rotates in the direction indicated by the arrow in Fig. 2, and its effect is to pulverize and level the soil as fast as the same is turned over.

My improvement is adapted for turning under or covering straw or clover with soil, which is effected by the teeth as they rotate from the mold-board.

Having described my invention, I claim and desire to secure by United States Letters Patent—

In combination with a plow, the rod $e$, having a bend, and provided thereat with the pin $h$, and one end attached to the plow-beam and the other end to the handle, so as to permit it to be turned up and entirely over, and the harrow I, attached at the bend of the rod and adapted to rotate, as set forth.

CALEB E. BROWN.

Witnesses:
 G. R. BYRNE,
 BENJ. NEWKIRK.